United States Patent [19]

Bearce, Jr. et al.

[11] Patent Number: 4,674,220

[45] Date of Patent: Jun. 23, 1987

[54] BAIT THREADER

[76] Inventors: Ronald H. Bearce, Jr., 922 Marshall St., Lake Geneva, Wis. 53147; Jerry S. Bearce, Rte. 1, Box 193, Avoca, Wis. 53506; David C. Jones, Rte. 5, Box 201, Delavan, Wis. 53115

[21] Appl. No.: 904,946

[22] Filed: Sep. 8, 1986

Related U.S. Application Data

[63] Continuation-in-part of Ser. No. 678,172, Dec. 4, 1984, abandoned.

[51] Int. Cl.⁴ .............................................. A01K 97/00
[52] U.S. Cl. ......................................................... 43/4
[58] Field of Search .................... 43/4, 4.5, 1

[56] References Cited

U.S. PATENT DOCUMENTS

| | | | |
|---|---|---|---|
| 2,423,899 | 7/1947 | Odgard | 43/4 |
| 2,948,979 | 8/1960 | Kulp | 43/4 |
| 2,967,373 | 1/1961 | Garrison | 43/53.5 |
| 3,050,869 | 8/1962 | Parker | 43/4 |
| 3,132,438 | 5/1964 | Ward | 43/53.5 |
| 3,385,619 | 5/1968 | Thomas | 43/1 |
| 3,925,919 | 12/1975 | Huth | 43/4 |
| 3,965,605 | 6/1976 | Allen | 43/1 |
| 4,014,130 | 3/1977 | Roberts | 43/53.5 |
| 4,073,083 | 2/1978 | Davis | 43/4 |

FOREIGN PATENT DOCUMENTS 2278259  2/1976  France ........................................ 43/1

*Primary Examiner*—Gene P. Crosby
*Attorney, Agent, or Firm*—Quarles & Brady

[57] ABSTRACT

A bait threading device which can be easily carried in the pocket of a fisherman yet has a bait threading needle which can be readily extended to accommodate various sizes of bait. In addition to affording the threading of a fishing line through the bait, the device of this invention also includes a cap member which is designed to aid in the removing of a hook from a fish as well as a means of tying a fishing line to the hook. On one embodiment, the bait threader device of this invention also has the advantage of not only acting as bait threader but also providing a hook removal feature in a unitary construction.

20 Claims, 19 Drawing Figures

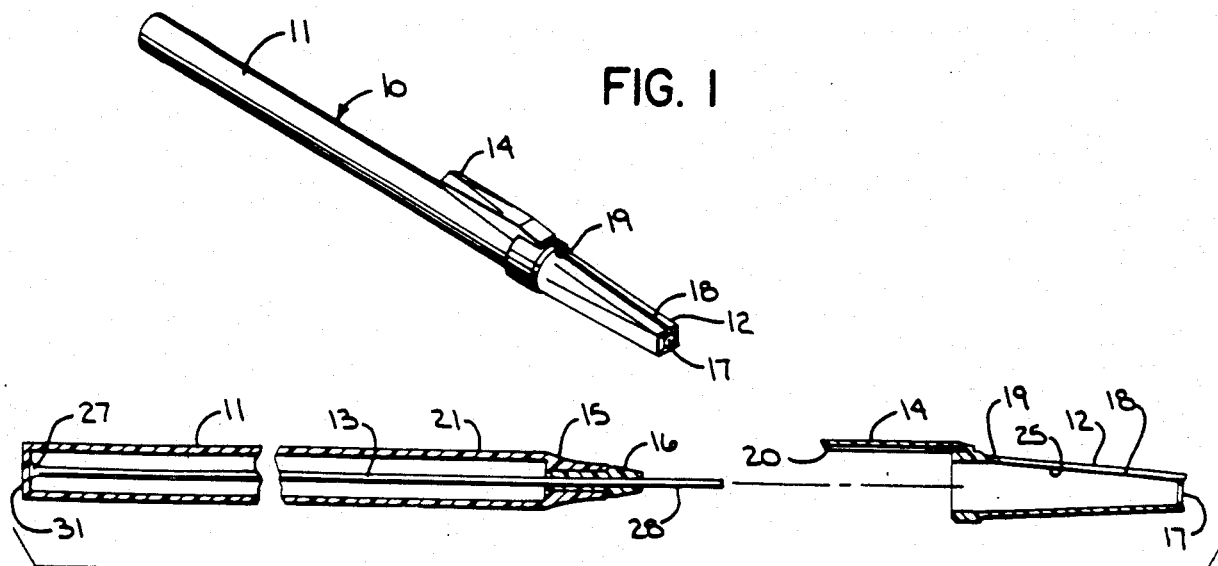
FIG. 1
FIG. 2
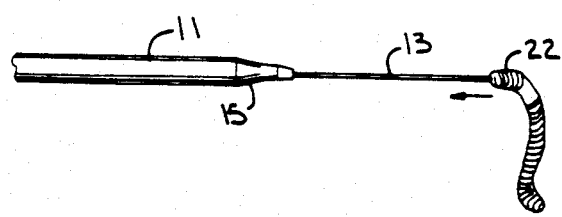
FIG. 3A
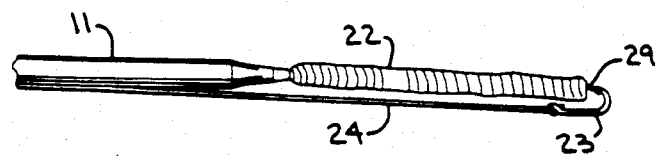
FIG. 3B
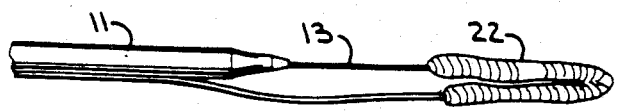
FIG. 3C
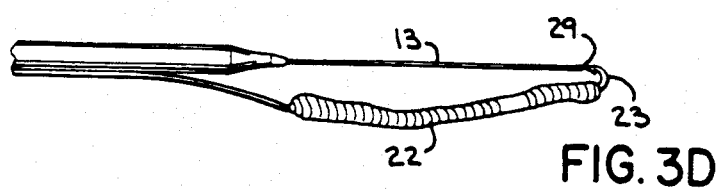
FIG. 3D
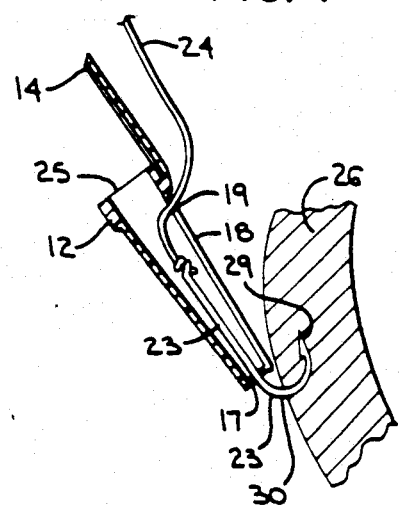
FIG. 4
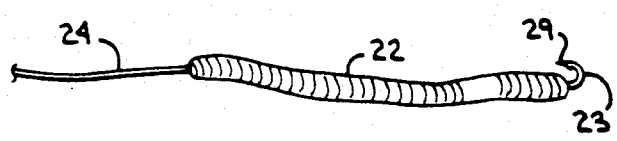
FIG. 3E

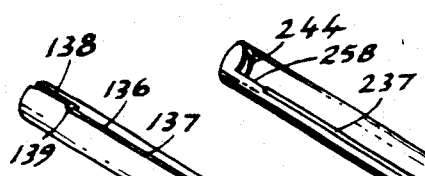
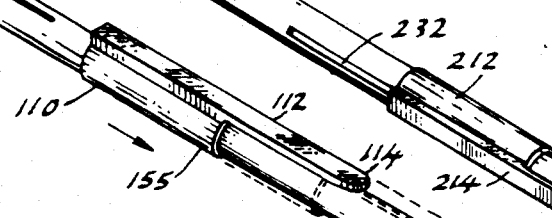
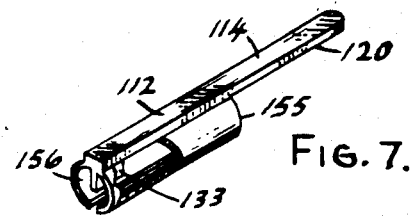
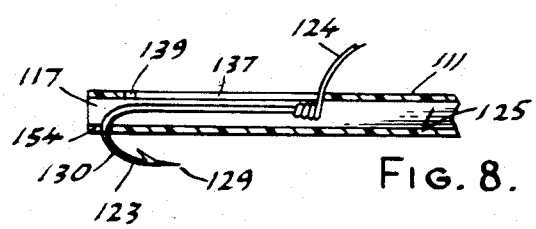
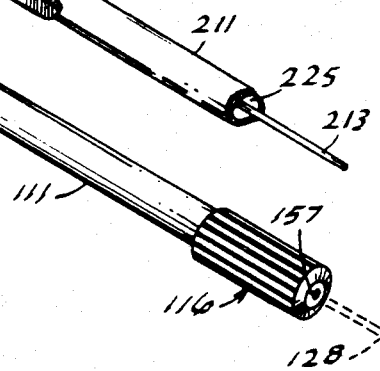
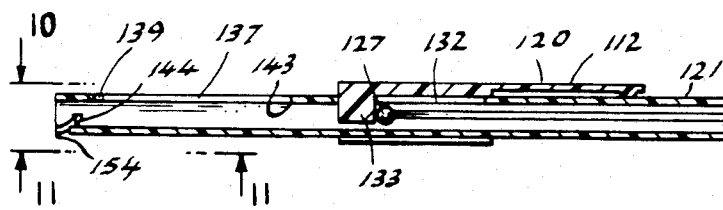
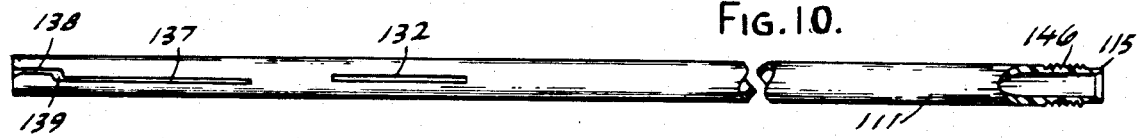
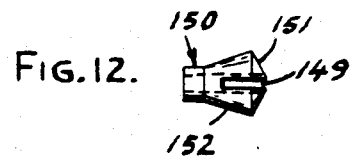
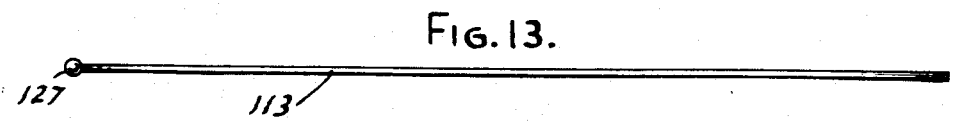
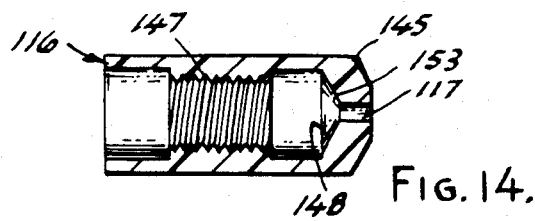

BAIT THREADER

CROSS-REFERENCE TO RELATED APPLICATIONS

This application is a continuation-in-part of application Ser. No. 678,172 filed Dec. 4, 1984 now abandoned.

BACKGROUND OF THE INVENTION

This invention relates to a device which will aid in threading a fishing line through the fishing bait such as a worm so as to place the hook at one end thereof. More particularly, this invention relates to a bait threading device which will fit into the pocket of a fisherman yet has an extendable needle for threading the bait thereover as well as a portion which can serve as a means of removing the hook from a fish as well as aid in tying of the fishing line to a fishing hook.

Fish bait threading devices of the type concerned with in this invention are described in U.S. Pat. Nos. 2,423,899; 2,948,979; 3,050,896; 3,925,919 and 4,073,083. In U.S. Pat. Nos. 2,423,899; 2,948,979; 3,925,919 and 4,073,083 there are shown threading devices by which a worm is threaded onto the line and the hook. The technique in general especially as set forth in U.S. Pat. No. 4,073,083 is similar to that described for the bait threading device of this invention. In U.S. Pat. No. 3,050,896 the bait threading device which resembles a mechanical pencil is described for threading the hook and line through a minnow.

The prior art does not provide a bait threading device wherein a needle can be carried inside a barrel member so as to be readily carried in the pocket of a fisherman and also be extendable to a length so as to provide the threading of a worm over the fishing line. Neither is the prior art concerned with providing a bait fishing device which also will aid in the removal of a hook from the bait; provide a means for tying a fishing line to a fishing hook and also a bait fishing device which can be buoyant so as to float in the water if inadvertently dropped therein. Another short-coming of the prior art is the provision of a bait threading unit which can perform all of the foregoing functions yet can be manufactured at a minimal amount of cost.

It is an advantage of the present invention to provide a bait threading device which is compact in its construction and has the versatility of threading bait of various sizes. Another advantage is to provide a bait threading device wherein a needle member is easily extended from yet retracted into a barrel member. Still other advantages are a bait threading device which also aids in the removal of any fish hook from the bait yet can aid in the tying of the fishing line to a fishing hook; can be buoyant so as to be able to float in the water and is economical to manufacture.

SUMMARY OF THE INVENTION

The foregoing advantages are accomplished and the shortcomings of the prior art are overcome by the present bait threading device wherein a needle member having an opening at one end thereof to receive the point of a fish hook is telescopingly received in a barrel member. The needle member is arranged to retract in one position so that in a storage position a portion is easily grasped for extension of the needle and in an extended position the needle will extend a sufficient length so as to completely traverse the alimentary canal of a bait. In one embodiment an actuator member is slidably positioned on a barrel member and has an engagement portion for extending through a wall of the barrel member for contact with the needle member. The actuator member, the barrel member and the needle member are constructed and arranged to provide a retraction of the needle member in one position so that a storage position is effected and in another position so that a limited extension is effected and a portion is easily grasped for extension of the needle member. In another embodiment, a closure member is adapted to be placed over the extendable end of the needle member when the needle member is in a storage position and in frictional engagement with the barrel member. In a preferred manner, the needle member is defined by a hollow tubular member and the barrel is substantially hollow and is fabricated of a material so as to provide in some instances a floatable bait threader and the hollow tubular member is fabricated from a brass metal. The barrel or the closure, which is in the form of a cap, provides a hook removal feature and includes a cavity with a slot extending longitudinally through the wall of the cavity with an aperture at the end of the slot and extending through the wall. Also in a preferred manner, the actuator member or the cap includes a clip portion which presents an elongated flat surface. This flat surface in conjunction with the surface of the barrel allows a holding of the shank portion of a fish hook so as to aid in the tying of the fishing line thereto.

BRIEF DESCRIPTION OF THE DRAWINGS

A better understanding of the present bait threading device will be had by reference to the drawing wherein:

FIG. 1 is a perspective view of the bait threading device in a storage condition.

FIG. 2 is a longitudinal view in vertical section showing the cap member removed therefrom.

FIGS. 3A–E are views in side elevation illustrating the method of utilizing the bait threading device of this invention in placing a worm onto a fishing line.

FIG. 4 is a partial view in vertical section showing the cap member of the bait threading device for use in removing a hook from a fish.

FIG. 6 is a perspective view of another embodiment of the bait threading device with the needle member shown in a limited extended position.

FIG. 7 is a perspective view of the actuator member removed from the bait threading device of FIG. 6.

FIG. 8 is an enlarged view in vertical section illustrating the hook removal feature of the bait threading device.

FIG. 9 is a view in vertical section of the bait threading device shown in FIG. 6.

FIG. 10 is a top plan view taken along line 10—10 of FIG. 9 but with portions removed.

FIG. 11 is a partial view of the bait threading device illustrating another aspect of the hook removal feature as taken along line 11—11 of FIG. 9.

FIG. 12 is an enlarged view of a clamping portion employed in the bait threading device.

FIG. 13 is a view in side elevation of the needle member employed in the bait threading device.

FIG. 14 is an enlarged view in vertical section showing a guide member used in the bait threading device.

FIG. 15 is a view similar to FIG. 6 except showing still another embodiment.

BRIEF DESCRIPTION OF THE PREFERRED EMBODIMENTS

Figure 5:
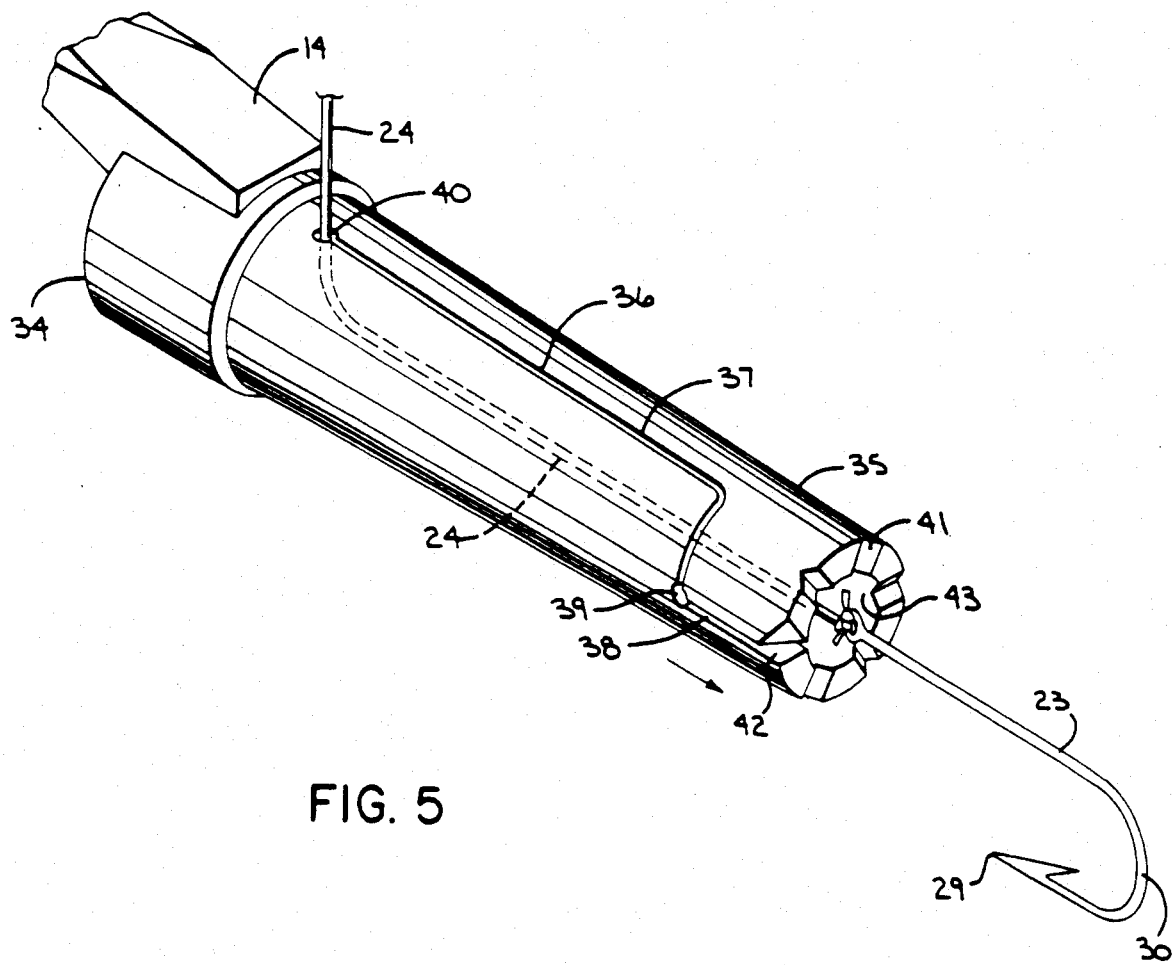
FIG. 5 is a perspective view of an alternative cap member for use with the bait threading device.

Proceeding to a detailed description of one embodiment of the invention and particularly to FIGS. 1 and 2, the bait threading device 10 generally includes a hollow barrel member 11 which is closed at one end by a cap member 12. The cap member 12 will have an opening 17 with a slot extending inwardly therefrom and terminating in an aperture 19. A needle member 13 which essentially is a hollow brass tube is telescopingly received in the barrel member 11. A nose portion 15 is provided at one end of the barrel member 11 and receives an annular guide 16 through which will slidably pass the needle member 13.

As best seen in FIG. 2, a clip portion 14 has a flat surface 20 and is biased in a manner to rest over a smooth surface 21 on the barrel member 11 for purposes as will be later explained. As also best seen in FIG. 2, the barrel member 11 is hollow substantially over its entire longitudinal length and is closed at one end by the wall 31 and at the other end by the nose portion 15 so as to provide a buoyant body which will float in the event that the threader 10 is inadvertently dropped into the water. The barrel member 11 is dimensioned so that it will receive a major portion of the needle member 13 with a small portion such as indicated at 28 extending therefrom when it is in the storage condition. This will facilitate the hand extension of the needle member 13 from the barrel member 11. It will also be seen that the needle member 13 includes a bevel 27 so as to captively hold the needle in the barrel when it is extended therefrom. In this manner the bevel 27 will engage the inner side of the nose portion 15 and the guide section 16.

In FIG. 5 an alternative embodiment of a cap member 34 is shown for use with the barrel member 11 of the bait threader 10. It will include the clip portion 14 as well as a nozzle portion 35 with a passageway 43 and a slot 36 extending through the wall and communicating with the passageway. Unlike cap member 12, the cap member 34 has an offset slot 36 with the offset portions 37 and 38. The apertures 39 and 40 are provided at the junction of the L-shaped slot portion 37 and the portion 38 as well at the end as of the portion 37. The V-shaped indentations 41 are disposed at the end of the nozzle portion 35 with the indentation 42 communicating with the slot 38.

Another embodiment of the bait threader is shown generally at 110 in FIGS. 6-14. Similar components are identified by the same numbers as employed in conjunction with the previously described unit 10 except they are in the "100" series. Bait threader 110 has the barrel member 111 with the actuator member 112 slidably positioned thereon. It has the clip portion 114 for attachment to one's clothing. A guide member 116 is threadably positioned on the barrel member 111. This is afforded by the external threads 146 disposed on the nose portion 115 of the barrel member 111 and the internal threader 147 disposed in theguide 116. (See FIGS. 9, 10 and 14.)

The needle member 113 is telescopingly received in the barrel member 111. It is guided therein by the opening 157 in the guide member 116. Positioned in the compartment 148 of the guide member 116 is a clamp member 150 having the transverse slot 149 to provide the needle member engaging jaws 151 and 152. This is best seen in FIGS. 9, 12 and 13.

Referring specifically to FIGS. 9 and 10, it is seen that barrel member 111 has a slot 132 to slidably receive the flange member 133 of the actuator member 112. The flange member 133 engages the stop member 127 on the needle member 113. The actuator member 112 is slidably moved over the barrel member 111 by means of the biased slotted portions 155 and 156.

As best seen in FIGS. 6, 8, and 10, the barrel member 111 has the slot portions 137 and 138 joined by the aperture 139. This is in the same manner as described for cap member 34 shown in FIG. 5. An additional hook removal feature is the curved slot 144 which also communicates with the cavity 125 of the barrel member 111.

An additional embodiment of the bait threader is shown generally at 210 in FIG. 15. Similar components are identified by the same numbers employed in conjunction with the previously described units 10 and 110 except they are in the "200" series. Device 210 closely resembles device 110 except for the hook removal feature. In the instance of unit 210, the curved slot 244 forms a continuous passageway with a thin line slot 258 which is 0.010-0.016 inch or $\frac{1}{8}$ to 3/16 inches wide. This slot in turn communicates with a wider slot 237 which is 0.020-0.030 inches wide. Slot 237 is thus dimensioned so that the line 124 (see FIG. 8) slides therein with no resistance but is thin enough not to allow a hook eye to pass through. The curved slot 244 and the linear slots 258 and 237 all communicate with the cavity 225 of the barrel member 211 with curved slot 244 also communicating with the adjacent end opening of the barrel member 211.

OPERATION

A better understanding of the advantages of the bait threaders 10 and 110 of this invention will be had by a description of their usage. Referring to bait threader 10 first it will be carried by the fisherman in the condition shown in FIG. 1 with the cap member 12 placed over the end of the barrel member 11. In this condition, the needle member 13 will be retracted and in the position as indicated in FIG. 2. When it is desired to thread a bait such as the worm 22 onto the line 24 with a hook 23, the needle member 13 will be grasped at the extended portion 28 and pulled to an extent such that the bevel portion 27 will engage the inside of the guide and the nose portions 16 and 15, respectively. With the needle member fully extended as indicated in FIG. 3A, the needle member will then be inserted onto the worm 22 by placing the needle member into and through the alimentary canal. This insertion or threading over the needle 13 will continue until the worm 22 assumes a position as shown in FIG. 3B. In this position, a line 24 with a hook 23 will have the point 29 placed in the open end of the needle member 13. The next step is then to move the worm 22 back over the needle 13 and consequently over the hook 23 as indicated in FIG. 3C. This movement will be continued as indicated until the worm 22 passes over a portion of the hook 23 allowing the point 29 to be exposed therefrom. The final step is the removal of the point 29 from the hollow needle member 13. This is the position indicated in FIG. 3E. The worm 22 is now in a position on the line 24 to be utilized as a bait. As experienced fishermen know, the placement of a worm 22 on a line 24 in the manner indicated in FIG. 3E is advantageous in that it presents a worm in a natural condition to the fish yet at the same time it prevents a fish from nibbling off an end portion of the worm without being caught on a hook such as 23.

The operation of the bait threader 110 is the same with respect to placement of the hook 123 and the line 124 in the worm 22 as described in FIGS. 3A-3E for bait threader 10. A distinct difference is the fact that an actuator member 112 is used to control the needle member 128 to partially extend it. This provides a portion to be grasped by the operator for subsequent full extension of the needle member. The partial extension is shown in the broken line showing of the needle member 128 in FIG. 6. This extension is effected by the flange member 133 of the actuator member sliding through the slot 132 and contacting the stop member 127. The partial extension of the needle member 113 is determined by the length of the slot 132. Tension on the needle member 113 is effected by the clamp member 150 which is partially positioned in the barrel member 111. It will have the jaws 151 and 152 partially collapsed on the needle member 113 as the clamp member 150 is forced into the needle member 111 by the guide member 116 threadably engaging the barrel member 111. This contact is afforded by the accommodating compartment 148 and the connical end wall 153.

The hook 123 removal feature is substantially the same as described for cap member 34 except that in addition a curved slot 144 is formed in the end of the barrel member 111. It has an end wall 154 for contact with the hook 123 to assist in its removal by a rotation of the barrel member 111. This is best seen in FIG. 8 where it will be seen that hook 123 is placed in contact with end wall 154 by placement through opening 117 and into the cavity 125 of the barrel member.

As indicated earlier, the bait threaders 10, 110 and 210 of this invention offer an added advantage in that the cap member 12 or the barrel members 111 or 211 can be utilized as a hook removing device. In the instance of unit 10, this is afforded by the fact that the cap member 12 has a cavity 25 as well as an opening 17 leading thereto. The slot 18 extends over a portion of the cap body and provides communication from outside the cap with the cap cavity 25. An aperture 19 is positioned at the inner end of the slot 18 and also is in communication with the cavity 25. In the event a hook 23 should become lodged inside of a fish such as indicated at 26, experienced fishermen know that it is difficult to remove the hook without substantially injuring the fish. Hook 23 removal is afforded in an expeditious manner with the cap 12 in that the cap can be placed on the line 24 by running the line through the slot 18 until the line is in engagement with the aperture 19. The cap will then be run down the line to a position as indicated in FIG. 4. In this manner, the clip portion 14 affords a handle which will facilitate the holding of the cap and in a manner adjacent to the point 29 of the hook 23 where it is embedded in the inside of the fish as indicated at 26. The cap then serves as a tool or a handle for exerting a force onto the curved portion 30 and thereby facilitates removal of the pointed portion 29 from the fish inside 26.

In addition, the clip portion 14 in conjunction with the smooth surface 21 of the barrel 11 serves as a means of tying a fishing line to the eye of a hook. The hook can be placed transversely under clip portion 14 and will be held between the flat surface 20 of the clip portion 14 and the smooth surface 21 of the barrel. In this manner, a holding device will be provided for the hook 23 as the bait threader can be placed on a supporting surface and two hands can be utilized to tie the fishing line into the hook of the needle. This also avoids undesired contact with the fingers of the hand with the point of the hook and one being accidentally contacted with the hook point.

The cap member 34 will be employed in essentially the same general manner as described for the cap member 12. The major difference is in the use of the indentations 41 and 42 as well as the offset slot 36. The indentations 41 and 42 will provide a holding means for engagement with the curved section 30 of the hook 23 during hook removal as previously indicated. In the event that a portion of the hook 23 should enter the indentation 42, its further passage into the nozzle portion 35 will be restricted as it will tend to come to rest in the aperture 39 and not be drawn into the L-shaped slot portion 37. This is effected because a straight pull action will be effected on the line 24 and parallel with the longitudinal axis of the nozzle portion 35.

The use of the bait threader 110 as a hook removal tool is essentially the same as previously described for cap member 34 except that it is used in conjunction with the barrel member 111. It also has the hook holding feature as provided by the clip portion 114 and the flat surface 120 for contact with the barrel member 111.

The operation of the bait threader 210 is basically the same as unit 110. The difference is in the hook 123 removal feature. In this instance the curved section 130 of the hook 123 is engaged in the curved slot 244 and the line pulled directly through the thin line slot 258 and into wider slot 237 with the eye of the hook positioned under the slot 237. The hook 123 will assume a position as indicated in FIG. 8 for unit 110.

In the foregoing description, it will be noted that the barrel 11 was formed with an end wall such as at 31 and as an integral part of the barrel. If desired, this portion could be formed as a separate cap piece and friction fitted therein as are nose and guide portions 16 and 17. While the needle members 13 and 113 are preferably formed from a hollow brass tube, other metals such as stainless steel and aluminum could be employed as well as rigid or semi-rigid plastic. Neither is it necessary that the needle member be entirely hollow so long as a portion is provided to provide an opening or a recess for a needle point 29. While the dimensions of the barrel members 11 and 111, and the needles 13 and 113 are not critical, it is important that they are of sufficient size so that when the needles 13 and 113 are extended from the barrel they can serve as a means of threading a worm onto the fishing line.

While the cap members 12 and 34 have the advantages of being utilized as both a hook remover and a means of tying a fishing line to a hook, the advantages of a telescoping bait threader could be utilized without them. Conversely, the cap members 12 and 34 could be employed without the bait threader. While the cap members 12 and 34 have been described for use in removing a single hook 23, it will be understood that they can also be utilized to remove a double hook attachment as well as a treble hook.

The preferred resinous plastic material for forming the barrel members 11, 111 and 211 and the cap members 12 and 34 is a semi-rigid plastic which would be sufficiently hard to withstand the rigors of use. However, any flexible plastic material or aluminum with styrofoam which is rigid enough to be employed for the intended use could be utilized to form the barrel members 11, 111 and 211 which will provide a floatable or nonfloatable bait threader.

It will thus be seen that through the present invention there is now provided a bait threading unit which is compact in its construction but yet is versatile so that it can accommodate various sizes of bait. The bait threading device of this invention also can be utilized to remove a hook from a fish as well as aid in the tying of a fish line to a fish hook. All of the above features are accomplished in a unit that is simple in its construction, easily manufactured and accordingly can be made available to the fisherman at low cost.

The foregoing invention can now be practiced by those skilled in the art. Such skilled persons will know that the invention is not necessarily restricted to the particular embodiments that are presented therein but the scope of the invention is to be defined by the terms of the following claims as given meaning by the preceding description.

We claim:

1. A combined fish hook bait threading device and fish hook remover comprising:
   a barrel member;
   a needle member having an opening at one end thereof to receive the point of a fish hook;
   said needle member positioned in telescoping relationship with respect to said barrel member and constructed and arranged to retract in one position so that in a storage position a portion is easily grasped for extension of said needle member and in an extended position said needle member will extend a sufficient length so as to completely traverse the alimentary canal of a bait; and
   a cap member adapted to be placed over the extendable end of said needle member when said needle member is in a storage position and in frictional engagement with said barrel member;
   said cap member including wall means defining a cavity; and
   slot means extending longitudinally through said wall means communicating with said cavity.

2. The combined fish hook bait threading device and fish hook remover as defined in claim 1 further including an aperture disposed at the most inward end of said slot means and extending through said wall means.

3. The combined fish hook bait threading device and fish hook remover as defined in claim 2 wherein said cap member includes a clip portion, said clip portion presenting an elongated flat surface, said flat surface in conjunction with the surface of said barrel member constructed and arranged to hold the shank portion of a fish hook.

4. The combined fish hook bait threading device and fish hook remover as defined in claim 1 wherein said needle member is defined by a hollow tubular member.

5. The combined fish hook bait threading device and fish hook remover as defined in claim 4 wherein said hollow tubular member is fabricated from a brass metal.

6. A fish hook removal device comprising:
   a cap member defining a wall means with a passageway;
   slot means extending longitudinally through said wall means from one end portion thereof and communicating with said passageway;
   indentations positioned in a spaced manner on said one end portion of said cap member, said slot means defined by at least two offset portions with at least one enlarged opening positioned through said wall means at the end of one of said portions.

7. A fish hook bait threading device comprising:
   a barrel member;
   a needle member having an opening at one end thereof to receive the point of a fish hook;
   said needle member positioned in telescoping relationship with respect to said barrel member;
   an actuator member slidably positioned on said barrel member and having an engagement portion extending through a wall of said barrel member for contact with said needle member, said actuator member, said barrel member and said needle member constructed and arranged to provide a retraction of said needle member in one position so that a storage position is effected and in another position so that a limited extension is effected and a portion is easily grasped for extension of said needle member, and in said extended position said needle member will extend a sufficient length so as to completely traverse the alimentary canal of a bait.

8. The fish hook bait threading device as defined in claim 7 wherein said barrel member includes wall means defining a cavity, and slot means extending longitudinally through said wall means communicating with said cavity.

9. The fish hook bait threading device as defined in claim 8 further including an aperture disposed in said slot means and extending through said wall means.

10. The fish hook bait threading device as defined in claim 9 wherein said slot means is defined by two offset portions and said aperture is disposed between them to provide a passage therebetween.

11. The fish hook bait threading device as defined in claim 8 further including an additional slot means extending in a curved manner through said wall means and spaced from said longitudinally extending slot means.

12. The fish hook bait threading device as defined in claim 8 further including an additional slot means extending in a curved manner through said wall means and in communication with said longitudinally extending slot means.

13. The fish hook bait threading device as defined in claim 7 wherein said actuator member includes clip means for attachment to clothing.

14. The fish hook bait threading device as defined in claim 7 further including a guide member constructed and arranged to engage said barrel member, said guide member having an opening to receive said needle member.

15. The fish hook bait threading device as defined in claim 14 further including a clamp member for said needle member positioned between the end of said barrel member and said guide member.

16. The fish hook bait threading device as defined in claim 15 wherein said needle member is defined by a hollow tubular member.

17. The fish hook bait threading device and fish hook remover as defined in claim 16 wherein said hollow tubular member is fabricated from a brass metal.

18. The fish hook bait threading device as defined in claim 17 wherein said barrel member is substantially hollow and is fabricated from a resinous plastic.

19. The fish hook bait threading device as defined in claim 17 wherein said barrel member includes an additional slot with closed ends to accommodate said engagement portion of said actuator member.

20. The fish hook bait threading device as defined in claim 19 further including a contact member positioned in said needle member for contact with said actuator member.

* * * * *